United States Patent [19]

Färnlund et al.

[11] Patent Number: 5,365,900
[45] Date of Patent: Nov. 22, 1994

[54] CYLINDER HEAD FOR AN INTERNAL COMBUSTION ENGINE

[75] Inventors: Jonny Färnlund, Skärholmen; Peter Sperle, Nykvarn, both of Sweden

[73] Assignee: Saab-Scania AB, Sweden

[21] Appl. No.: 172,040

[22] Filed: Dec. 22, 1993

[30] Foreign Application Priority Data

Dec. 23, 1992 [SE] Sweden .................. 9203899

[51] Int. Cl.$^5$ .................................................. F02F 7/00
[52] U.S. Cl. ...................... 123/193.5; 123/195 R; 123/302; 123/308
[58] Field of Search .......... 123/90.39, 90.61, 188.14, 123/193.5, 195 R, 302, 308, 41.82 R

[56] References Cited

U.S. PATENT DOCUMENTS

| | | | |
|---|---|---|---|
| 3,898,966 | 8/1975 | List | 123/188.14 |
| 4,471,731 | 9/1984 | Kasting et al. | 123/195 C |
| 4,703,729 | 11/1987 | Sakano et al. | 123/308 |
| 4,945,873 | 8/1990 | Kirchweger | 123/91.82 R |
| 5,035,209 | 7/1991 | Braker et al. | 123/90.61 |

FOREIGN PATENT DOCUMENTS 0282726 8/1962 Netherlands.

*Primary Examiner*—Noah P. Kamen
*Attorney, Agent, or Firm*—Ostrolenk, Faber, Gerb & Soffen

[57] ABSTRACT

A cylinder head for an international combustion engine comprises at least two separate intake ports with each incorporate one intake valve and at least one exhaust port, which in turn incorporates one exhaust valve, where the intake ports and the exhaust port have their openings on opposite lateral faces of the cylinder head. The cylinder head also comprises a centrally arranged fuel injector which is driven by a top rocker arm, a push rod passing through the cylinder head, and a bottom camshaft. The cylinder head is also designed with a common vertical shaft or through hole which incorporates push rods for transferring the drive from the camshaft to the valves and to the fuel injector. The shaft is arranged between the two intake ports.

16 Claims, 3 Drawing Sheets

CYLINDER HEAD FOR AN INTERNAL COMBUSTION ENGINE

BACKGROUND OF THE INVENTION

The present invention relates to a cylinder head for an internal combustion engine, having a fuel injector therewith associated and particularly to the design of the head for receiving the operating rods of the cylinder head components.

The design of a cylinder head normally involves several compromises between a number of conflicting aims. Several of these are here mentioned. Intake ports are required to be designed with sufficient length to provide suitable intake air control. The intake ports must connect to the combustion chamber with a certain inclination to provide a certain vorticity or swirling in the combustion chamber. The exhaust ports must be designed short enough to avoid the diffusion of heat in the cylinder head. The mounting holes of the cylinder head must be arranged so that they are uniformly distributed to provide even clamping against the engine block. Cooling ducts must be located in the most suitable position. Fuel injectors must be fitted centrally to optimize combustion in the combustion changer. Provision must be made for supplying fuel to the fuel injectors via suitably shaped feed lines. The cylinder head must be manufactured by a suitable production method. One basic problem is that there is a shortage of sufficient space for the required partial solutions within the limited volume of the cylinder head.

In the case of cylinder heads for diesel engines with four valves per cylinder and with separate intake ports these problems are more pronounced. Moreover, if the fuel injector is of the type which is referred to as a "unit injector", it requires a mechanical drive for generating a high injection pressure, and this drive also requires a great deal of space. Normally, such a fuel injector is driven by the engine camshaft in a similar fashion to the valve drive. Where the camshaft is located below the cylinder head, a number of push rods must be arranged between the camshaft and the cylinder head. These push rods must in turn actuate rocker arms on the cylinder head to control the fuel injector and valves. The push rods are normally arranged to pass through the cylinder head via a number of through holes designed for this purpose. Where the cylinder head is of the so-called crossflow type, which means that the intake ports and exhaust ports open out on opposite sides of the cylinder head, the intake and exhaust ports will occupy a large amount of space, causing problems in finding a suitable space for the through holes of the push rods.

U.S. Pat. No. 4,945,873 describes a cylinder head in which the push rods for the intake and exhaust valves are located in the same through hole. There is no push rod for driving the fuel injectors, and there are no further details given on the design of the cylinder head. In order to find space for the intake ports, they are not designed as separate ports but they are combined to form one common port, which is not only common to the intake ports for one cylinder but for two. This makes it necessary to provide a cylinder head which is common to at least two cylinders. In this case it is necessary to sacrifice the design of the intake ports, which is probably not the best design from the flow viewpoint.

SUMMARY OF THE INVENTION

An object of the invention is to design a cylinder head to provide a suitable location for push rods for driving fuel injectors and valves in a four-valve engine, even where the engine is provided with separate cylinder heads for each cylinder. The cylinder head must not therefore display the above mentioned limitations of the prior art. An object of the invention is therefore to ensure that all the other components of the cylinder head can be located in the best possible positions.

The objects of the invention are achieved by designing the cylinder head with the following features. A cylinder head for an international combustion engine comprises at least two separate intake ports, with each incorporating one intake valve, and comprises at least one exhaust port, which in turn incorporates one exhaust valve, where the intake ports and the exhaust port have their openings on opposite lateral faces of the cylinder head. Push rods are operable to operate the valves from a bottom camshaft beneath the head to a rocker arm above it. The cylinder head also comprises a centrally arranged fuel injector which is driven by a top rocker arm, a push rod passing through the cylinder head to the rocker arm, and the bottom camshaft. The cylinder head is also designed with a common vertical, shaft or through hole which receives the push rods for transferring the drive from the camshaft to all of the valves and to the fuel injector. The common shaft is arranged between the two intake ports.

By bringing together all the push rods belonging to a cylinder in the same through hole or common shaft, this hole will occupy relatively little space in the cylinder head. This also allows the push rod and the rocker arm for driving the fuel injector to be located centrally and in a favorable position from the point of view of power transmission. By arranging the through hole in the area between two separate intake ports, these ports can be designed with sufficient length and with sufficient deflection to be favorable from the point of view of flow.

Advantageous embodiments of the invention are described in further detail in the examples below.

BRIEF DESCRIPTION OF THE DRAWINGS

The description example is given with reference to the attached drawings, in which.

DESCRIPTION OF A PREFERRED EMBODIMENT

Figure 1:
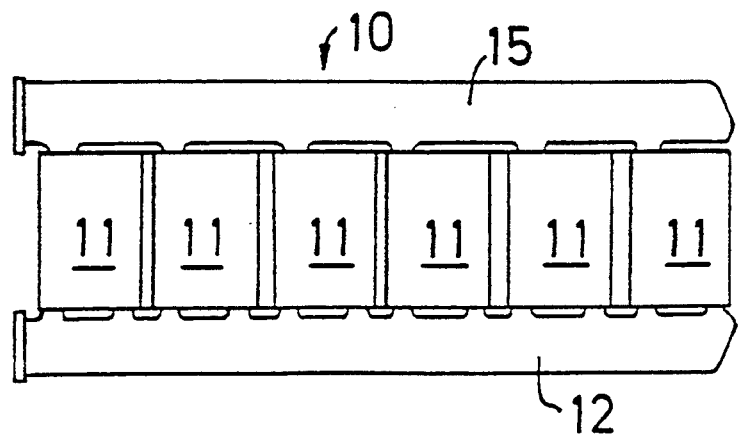
FIG. 1 shows, in principle, a top plan view of a multi-cylinder engine.

Referring now to the drawings wherein like numerals indicate like elements, there is shown in FIG. 1 a top plan view of a multi-cylinder internal combustion engine 10, for example a diesel engine designed to drive a heavy vehicle, such as a truck or bus. Engine 10 consists of an inline engine and in this example comprises six inline cylinders constituting the combustion chamber of the engine. The engine is fitted with a separate cylinder head for each cylinder, and therefore has six cylinder heads 11. On one side of the engine, an intake manifold 12 is secured to cylinder heads 11 for supplying the cylinders with combustion air, and an exhaust manifold 15 is secured to the opposite side of the engine for discharging combustion gases. Engine 11 is therefore of the crossflow type, which means that its inlet and outlet are arranged on opposite sides, and that the flow through engine 11 is from one side to the other. All cylinder heads 11 have the same design and only one of them will be described in the following.

Figure 2:
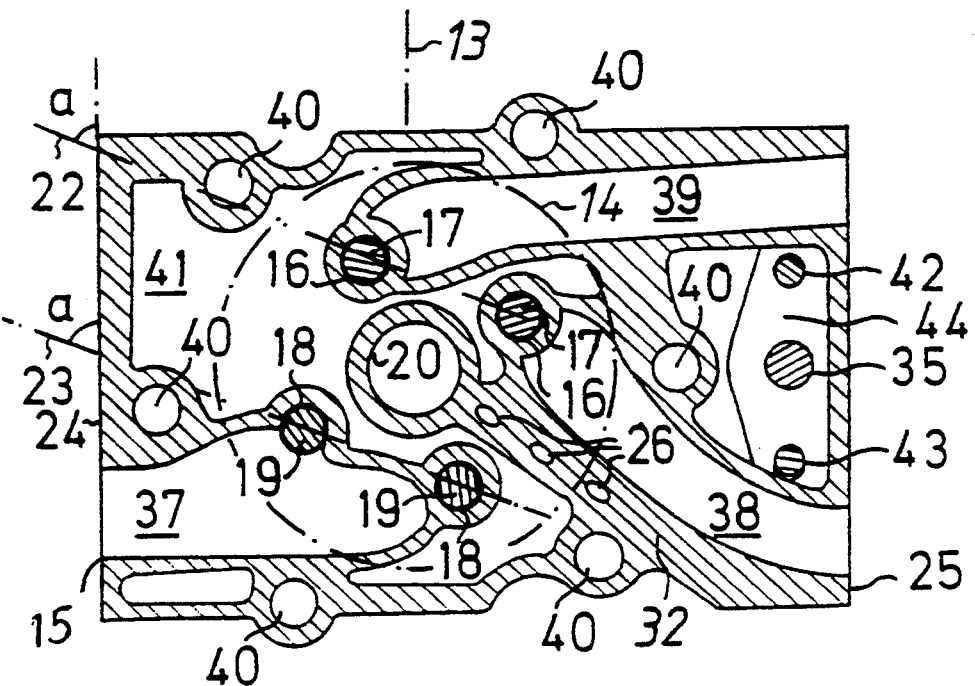
FIG. 2 shows a horizontal section 2—2, according to FIG. 4, of a separate cylinder head incorporated in the engine.
Figure 4:
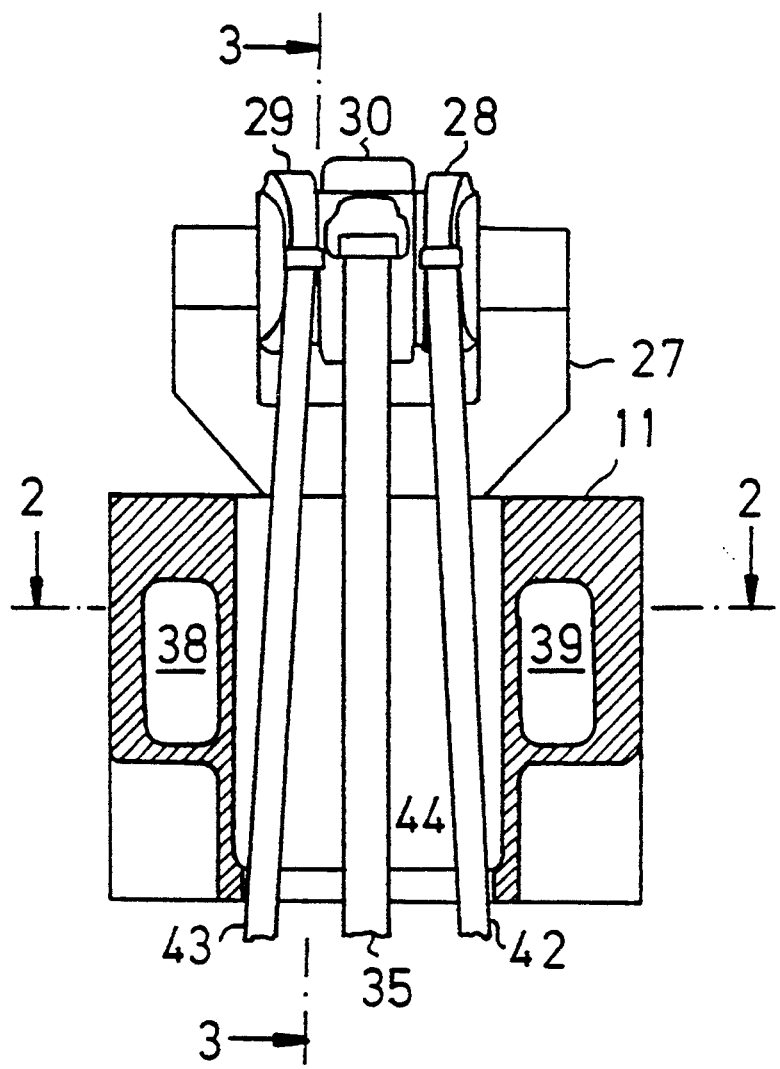
FIG. 4 shows a vertical section 4—4, according to FIG. 3.

FIG. 2 shows cylinder head 11 designed for one of cylinders 14 in a horizontal cross-section 2-2 according to FIG. 4. The horizontal cross-section shown in FIG. 2 extends parallel with the bottom of cylinder head 11, and extends perpendicularly in relation to a central line of symmetry of cylinder 14. The extension of cylinder 14 is shown by dash lines in the Figure.

Figure 3:
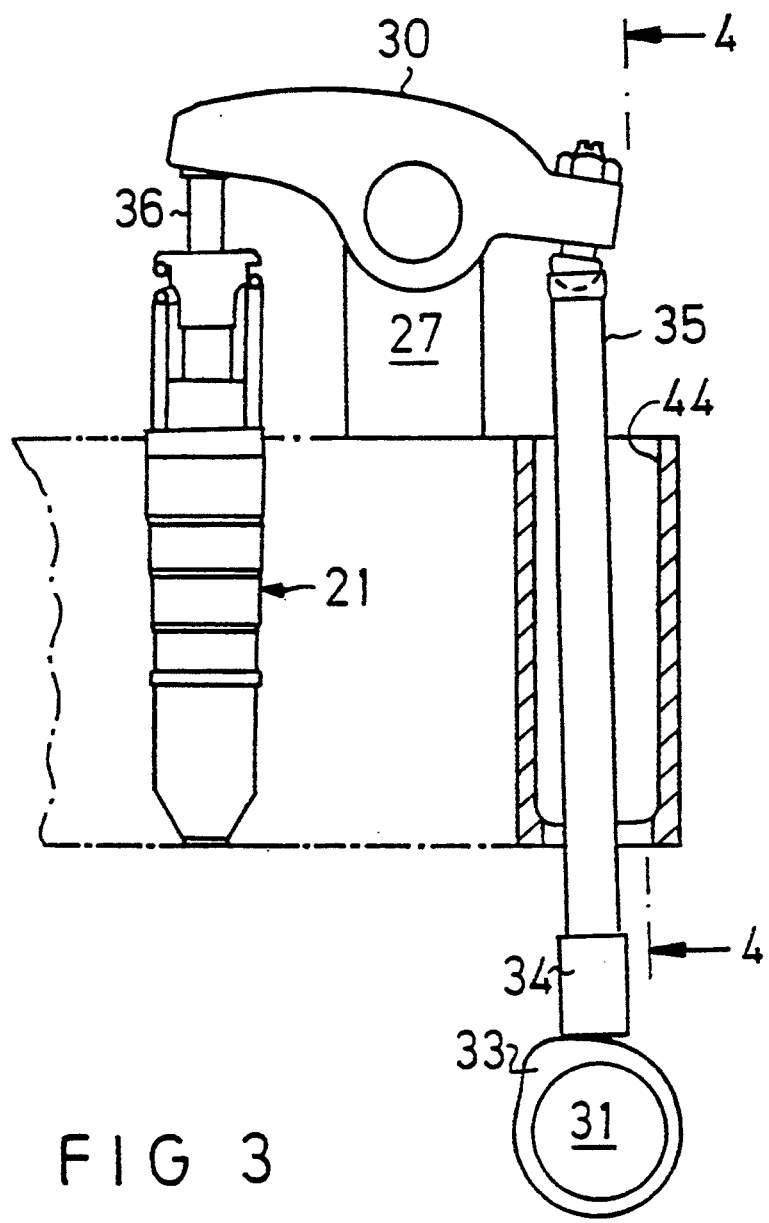
FIG. 3 shows a vertical section 3—3, according to FIG. 4, of the cylinder head.

Cylinder head 11 is provided with two holes 16 for intake valves 17, and two holes 18 for exhaust valves 19, together with a recess or hole 20, arranged centrally relative to cylinder 14, and also concentrically with cylinder 14, for a fuel injector 21 (FIG. 3). The engine is therefore a four-valve engine. A horizontal line 22 through both intake valves 17 runs parallel with a horizontal line 23 extending through both exhaust valves 19, and both these lines 22, 23 extend in a direction which forms a certain angle $\alpha$ to the lateral faces 24, 25 of the cylinder head. Lateral faces 24, 25 of the cylinder head run parallel with each other and with a vertical plane of symmetry 13 in the longitudinal direction of the engine. Thus, lines 22, 23 form the same angle $\alpha$ to the vertical plane of symmetry 13 of the engine Angle $\alpha$ is advantageously approximately 70° but other angles ranging from 50° to 75° may suitably be selected in modified embodiments. Valves 17, 19 are therefore arranged with angular distortion.

The fuel injector 21, which is normally mounted in central hole 20, is shown in FIG. 3. Fuel injector 21 is of the type normally referred to as a "unit injector". Fuel injector 21 is fed with fuel at moderate pressure via a feed line from a fuel pump (not shown), whereupon a high pressure suitable for the injection is generated by mechanical actuation of injector 21 to perform a pumping movement. Fuel injector 21 is also connected to the fuel pump by a pipe for return fuel and a pipe for transmitting a control pressure. These three pipes are designed in the cylinder head as three drilled ports 26 in a wall 32 located between one of intake valves 17 and one of exhaust valves 19, as shown in FIG. 2. The mechanism used to generate the pumping movement of the fuel injector is shown diagrammatically in FIG. 3. A bearing bracket 27 supports three rocker arms 28-30 (FIG. 4). Rocker arms 28, 29 drive the intake and exhaust valves 17 and 19, respectively. Rocker arm 30 drives fuel injector 21. The bearing bracket is secured by means of a bolted joint so that it can be mounted on cylinder head 11.

The engine camshaft 31 is arranged at the bottom or underneath cylinder head 11, in the engine block (not shown), and is driven in a known way by the engine crankshaft. Camshaft 31 is designed with cams which actuate the rocker arms 28-30 located above the cylinder head 11 by means of respective valve tappets 34 located on push rods 35, 42 and 43. One of the rocker arms 28 actuates a bridge between the intake valves 17 so that both intake valves 17 are actuated simultaneously by the same rocker arm 28. Similarly, a bridge for causing both exhaust valves 19 to be actuated by the second rocker arm 29 is arranged between exhaust valves 19. A third rocker arm 30, which is in this case used to drive fuel injector 21 by a similar method, is arranged between the rocker arms 28, 29. The fuel injector 21 therefore receives its pumping movement from a cam 33 on camshaft 31, which actuates central rocker arm 30, by means of a tappet 34 and a push rod 35, and which in turn rests against a pump rod 36 on fuel injector 21.

As best shown in FIG. 2, cylinder head 11 is designed with an exhaust port 37 via which exhaust gases escaping from both exhaust valves 19 of the engine can be fed to its opening at exhaust manifold 15 on one side 24 of cylinder head 11. Exhaust port 37 is common to the exhaust gases from both exhaust valves 19. The engine is constructed with two intake ports 38, 39, which are designed as separate ports for the respective intake valves 17, for feeding intake air from intake manifold 12 to the combustion chamber. Intake ports 38, 39 have their opening on the other, opposite side 25 of cylinder head 11.

Cylinder head 11 is designed with a number of mounting holes 40 intended for bolted joints enabling cylinder head 11 to be mounted on the engine block. Mounting holes 40 have been chosen to lie in a position which is approximately concentric relative to the cylinder 14 and therefore relative to the hole 20 for fuel injector 21. Similarly, bolt holes 40 are chosen to lie in a position where there is essentially equal mutual angular distribution. This provides even clamping to the engine block which does not subject the cylinder head 11 to unfavorable stress concentrations.

Cylinder head 11 is provided, by a known method, with a number of cooling ducts 41 through which coolant is pumped to dissipate heat from cylinder head 11.

FIG. 3 shows a cross-section 3—3 of FIG. 4, indicating that push rod 35, which actuates the central rocker arm 30, extends through a vertically extending shaft 44 which constitutes a lead through passage or hole between the top and bottom of the cylinder head 11. FIG. 3 should be regarded as diagrammatic because the other parts of the cylinder head 11 have not been fully reproduced. Some are shown by dash-dot lines. FIG. 4 shows the shaft 44 viewed in a section 4—4 of FIG. 3, indicating that the shaft extends in the area between the two intake ports 38, 39, and that push rod 35 for fuel injector 21 is arranged between a push rod 42 for intake valves 17 and a push rod 43 for exhaust valves 19. All of these push rods 35, 42, 43 pass through the common shaft 44. Push rod 35 for fuel injector 21 requires a relatively high force, and therefore has a larger diameter than the other two.

Push rod 35 for the fuel injector 21 extends essentially vertically and in a plane perpendicular to the extension (axis of rotation) of camshaft 31 in its longitudinal direction. Push rod 35, fuel injector 21 and rocker arm 30 for fuel injector 21 are also mutually arranged essentially in the same vertical plane, which extends at right angles to camshaft 31. This position ensures that fuel injector 21 can be driven both with great force and great accuracy, and that the fuel injection is also very accurate. Push rods 42, 43 for valves 17, 19 are arranged with a certain inclination relative to the extension of push rod 35 of the fuel 10 injector, which is due mainly to the shortage of space prevailing at the top of cylinder head 11. However, this inclination is not a major inconvenience. First, the forces requires for the valve control are smaller than those required for actuating the fuel injector, and second a minor deviation in the control of valves 17, 19 would not cause a major difficulty. Similarly, rocker arms 28, 29 for valves 17, 29 are arranged at a slight angle to each other to reduce the space occupied by push rods 35, 42, 43 between intake ports 38, 39.

As is evident from the above, valves 17, 19 are arranged with angular distortion, which has enabled intake ports 38, 39 to be designed with a longer extension than would otherwise be possible. This has the advantage that the intake air to the cylinder can be better controlled because its flow can be influenced over a longer distance. It also means, however, that the hot exhaust gases are able to heat the cylinder head along a longer section. The distortion chosen actually represents a compromise in which the advantages of long intake ports 38, 39 are fully utilized without the disadvantage of too long an exhaust port 37 becoming obvious.

By designing shaft or through hole 44, extending through the cylinder head 11 for push rods 35, 42, 43, as a shaft common to all the push rods, the space required has generally been reduced to accommodate the longer extension of intake ports 38, 39. From the production point of view, the construction of a longer shaft 44 has the advantage over several smaller holes in that cylinder head 11 can be cleaned more easily from mold cores and cylinder head 11 can also be produced relatively simply and cheaply.

Constructing shaft 44 between the two intake ports 38, 39 also has the advantage that the volume of cylinder head 11 will still be limited, and that the components required for each cylinder are housed within the available space. This provides the possibility of constructing cylinder heads 11 as separate units, with the advantages this brings in terms of simple, standardized production among other things. This does not rule out the possibility of using the invention to advantage in modified designs where the engine is fitted with a cylinder head which is common to several cylinders.

The invention is not therefore restricted to the exemplified embodiment but can be modified in alternative designs within the scope of the attached claims. Therefore, the number of valves need not necessarily be four per cylinder buy may be either a smaller or a larger number. Similarly, the exhaust ports may alternatively be constructed as exhaust ports separate from each valve. In the example shown, the separate intake ports are connected to corresponding separate port sections of the intake manifold. In an alternative embodiment, the intake manifold need not be designed with such separate port sections.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A combination comprising:
   (A) a cylinder head for an internal combustion engine, the cylinder head having:
      (1) first and second lateral sides;
      (2) first and second intake ports into the cylinder head and having openings on the first lateral side;
      (3) an exhaust port into the cylinder head and having an opening on the second lateral side;
      (4) a vertically extending shaft extending from the top to the bottom of the cylinder head and located between the first and second in take ports;
   (B) first and second intake valves housed in the first and second intake ports, respectively;
   (C) an exhaust valve housed in the exhaust port;
   (D) a fuel injector centrally housed in the cylinder head;
   (E) a camshaft located below the cylinder head;
   (F) respective rocker arms located above the cylinder head for driving the intake valves, the exhaust valves and the fuel injector; and
   (G) a respective push rod coupling the camshaft to the respective rocker arms, and the push rods for the cylinder head extending through the vertically extending shaft in the cylinder head.

2. The combination according to claim 1, further comprising a second exhaust valve housed in an exhaust port formed in the cylinder head.

3. The combination according to claim 2, wherein both of the exhaust valves are located in a single one of the exhaust ports.

4. The combination according to claim 3, wherein the push rods include first, second and third push rods and the rocker arms include first, second and third rocker arms; the first push rod being coupled between the camshaft and the first rocker arm, the first rocker arm being for driving the fuel injector; the second and third push rods being coupled between the cam shaft and the second and third rocker arms, respectively, the second and third rocker arms being for driving the exhaust valves and the intake valves, respectively.

5. The combination according to claim 2, wherein the engine has a series of cylinders arrayed along a longitudinal direction, and imaginary lines extending through the intake valves and exhaust valves, respectively, form an angle to a longitudinal direction of the internal combustion engine.

6. The combination according to claim 5, wherein the push rods include first, second and third push rods and the rocker arms include first, second and third rocker arms; the first push rod being coupled between the camshaft and the first rocker arm, the first rocker arm being for driving the fuel injector; the second and third push rods being coupled between the cam shaft and the second and third rocker arms, respectively, the second and third rocker arms being for driving the exhaust valves and the intake valves, respectively.

7. The combination according to claim 5, wherein the angle is between 50° and 70°:

8. The combination according to claim 7, wherein the angle is about 70°.

9. The combination of claim 1, wherein the push rods include first, second and third push rods and the rocker arms include first, second and third rocker arms; the first push rod being coupled between the camshaft and the first rocker arm, the first rocker arm being for driving the fuel injector; the second and third push rods being coupled between the cam shaft and the second and third rocker arms, respectively, the second and third rocker arms being for driving the exhaust valves and the intake valves, respectively.

10. The combination of claim 9, wherein the first push rod is located between the second and third push rods in the area where they extend through the vertical shaft.

11. The combination according to claim 9, further comprising a common bearing bracket on the cylinder head on which the rocker arms for the valves and the rocker arm for the fuel injector are all mounted.

12. The combination according to claim 1, wherein the push rod coupled to the rocker arm for the fuel injector extends in a plane which is perpendicular to the axis of rotation of the camshaft.

13. The combination according to claim 12, wherein there are two other push rods coupled to the rocker arms for the intake and exhaust valves, respectively, the two other push rods extending at an inclination to the plane in which the push rod for the fuel injector extends.

14. The combination according to claim 1, wherein the cylinder head is coupled to a single engine cylinder.

15. A combination according to claim 1, in that it is incorporated in a multi-cylinder engine, and in that each cylinder has a cylinder head of essentially the same design.

16. In a multi-cylinder internal combustion engine, a plurality of cylinder heads, each cylinder head being coupled to a respective cylinder and comprising:
(A) a cylinder head for an internal combustion engine, the cylinder head having:
  (1) first and second lateral sides;
  (2) first and second intake ports into the cylinder head and having openings on the first lateral side;
  (3) an exhaust port into the cylinder head and having an opening on the second lateral side;
  (4) a vertically extending shaft extending from the top to the bottom of the cylinder head and located between the first and second in take ports;
(B) first and second intake valves housed in the first and second intake ports, respectively;
(C) an exhaust valve housed in the exhaust port;
(D) a fuel injector centrally housed in the cylinder head;
(E) a camshaft located below the cylinder head;
(F) respective rocker arms located above the cylinder head for driving the intake valves, the exhaust valves and the fuel injector; and
(G) a respective push rod coupling each camshaft to the respective rocker arms and the push rods for the cylinder head extending through the vertically extending shaft in the cylinder head.

* * * * *